(12) United States Patent
Nakamizo et al.

(10) Patent No.: US 6,566,013 B2
(45) Date of Patent: May 20, 2003

(54) NONAQUEOUS SECONDARY BATTERY

(75) Inventors: Shiori Nakamizo, Amagasaki (JP);
Hiroshi Watanabe, Sumoto (JP);
Satoshi Narukawa, Sumoto (JP)

(73) Assignee: Sanyo Electric Co., Ltd., Osaka (JP)

(*) Notice: Subject to any disclaimer, the term of this patent is extended or adjusted under 35 U.S.C. 154(b) by 230 days.

(21) Appl. No.: 09/735,953

(22) Filed: Dec. 14, 2000

(65) Prior Publication Data

US 2001/0004504 A1 Jun. 21, 2001

(30) Foreign Application Priority Data

Dec. 15, 1999 (JP) .......................................... 11-355852

(51) Int. Cl.⁷ .......................................... H01M 10/40
(52) U.S. Cl. ........................ 429/303; 429/247; 429/129
(58) Field of Search ................................ 429/306, 316, 429/317, 254, 303, 247

(56) References Cited

U.S. PATENT DOCUMENTS 5,837,015 A * 11/1998 Venugopal et al. ......... 29/623.2
5,981,107 A * 11/1999 Hamano et al. ......... 429/231.95
6,024,773 A * 2/2000 Inuzuka et al. ............. 29/623.4
6,042,965 A * 3/2000 Nestler et al. .............. 429/129

FOREIGN PATENT DOCUMENTS

| JP | 4-171660 | 6/1992 |
| JP | 8-507407 | 8/1996 |
| JP | 10-64503 | 3/1998 |
| JP | 10-189054 | 7/1998 |
| JP | 11-16561 | 1/1999 |
| WO | 94/20996 | 9/1994 |

* cited by examiner

Primary Examiner—John S. Maples
(74) Attorney, Agent, or Firm—Nixon & Vanderhye P. C.

(57) ABSTRACT

A nonaqueous secondary battery of the present invention comprises a polyvinylidene fluoride resin layer formed on either or both of the surface of the positive electrode and the negative electrode. This polyvinylidene fluoride resin layer exhibits excellent liquid retaining properties and thus can be formed on the surface of the electrodes to reduce the capacity drop during high temperature storage and hence improve the high temperature storage properties of the battery.

9 Claims, 2 Drawing Sheets

NONAQUEOUS SECONDARY BATTERY

BACKGROUND OF THE INVENTION

1. Field of the Invention

The present invention relates to a nonaqueous secondary battery comprising a negative electrode capable of intercalating/deintercalating lithium ion, a positive electrode made of a lithium-containing metal oxide as an active positive electrode material, a nonaqueous electrolyte and a separator for separating the positive electrode and the negative electrode from each other.

2. Description of the Related Art

Recently, electronic apparatus have shown a remarkable reduction of size and weight. Under these circumstances, it has been keenly desired to reduce the size and weight of battery as power supply. Accordingly, a secondary lithium battery such as lithium ion battery has been put to practical use as rechargeable battery having a small weight and high capacity. Such a secondary lithium battery has been used for portable electronic and communications apparatus such as small-sized video camera, portable telephone and note type personal computer.

This type of a secondary lithium battery comprises as an active negative electrode material a carbon-based material capable of intercalating/deintercalating lithium ion, as an active positive electrode material a lithium-containing metal oxide such as $LiCoO_2$, $LiNiO_2$, $LiMn_2O_4$ and $LiFeO_2$, and an electrolytic solution obtained by dissolving a lithium salt as a solute in an organic solvent. These components are assembled into a battery. When this battery is charged for the first time, lithium ions eluted from the active positive electrode material enter in the carbon particles to make the battery rechargeable.

Such a nonaqueous secondary battery comprises a nonaqueous electrolyte. Accordingly, as the separator for separating the positive electrode and the negative electrode from each other there has heretofore been used a microporous membrane of a polyolefin-based resin which has a low reactivity with an organic solvent and is inexpensive, such as polyethylene (PE) and polypropylene (PP).

However, a microporous membrane of polyethylene or polypropylene is disadvantageous in that it merely keeps a retainability of electrolyte in its pores and thus cannot fairly retain an electrolytic solution, causing an increase of internal resistivity resulting in a drastic drop of the battery capacity after high temperature storage.

In order to improve the liquid retaining properties of the battery, it has been practiced to use a non-woven cloth of polypropylene (PP) or polyethylene terephthalate (PET) as a separator. However, a non-woven cloth of polypropylene (PP) or polyethylene terephthalate (PET) is disadvantageous in that it causes a drastic drop of the battery capacity after high temperature storage as in the case of microporous membrane.

As a countermeasure, the use of a polyvinylidene fluoride (PVdF) membrane having good liquid retaining properties has been proposed. Since the polyvinylidene fluoride resin membrane can fairly keep retainability of electrolyte and come in close contact with the electrodes, the resulting battery exhibits a lowered internal resistivity and hence improved properties.

Such a nonaqueous secondary battery is normally produced by laminating a positive electrode and a negative electrode with a separator provided interposed therebetween, spirally winding the laminate to prepare an electrode body, and then inserting the electrode body in a cylindrical battery case. However, the polyvinylidene fluoride membrane is disadvantageous in that it has a low mechanical strength and thus can break to cause internal shortcircuiting when spirally wound.

SUMMARY OF THE INVENTION

Under these circumstances, the present invention has been worked out to solve the foregoing problems. An object of the invention is to provide a nonaqueous secondary battery which comprises an electrolytic solution having an improved maintenance and undergoes little or no internal shortcircuiting to exhibit excellent high temperature storage properties and overcharging properties.

In order to accomplish the foregoing object of the invention, the nonaqueous secondary battery of the invention comprises a polyvinylidene fluoride resin layer formed on either or both of the surface of the positive electrode and the negative electrode. This polyvinylidene fluoride resin layer exhibits excellent liquid retaining properties and thus can be formed on the surface of the electrodes to reduce the capacity drop during high temperature storage and hence improve the high temperature storage properties of the battery.

As the polyvinylidene fluoride resin there is preferably used a vinylidene fluoride homopolymer or a vinylidene fluoride copolymer of vinylidene with one or more selected from the group consisting of ethylene trifluorochloride, ethylene tetrafluoride, propylene hexafluoride and ethylene.

While the formation of such a polyvinylidene fluoride resin layer on the surface of the electrodes makes it possible to improve the liquid retaining properties of the electrodes, the increase of the thickness of the polyvinylidene fluoride resin layer causes an increase of the internal resistivity of the battery. Therefore, it is necessary that the thickness of the polyvinylidene fluoride resin layer be restricted. It was experimentally confirmed that when the thickness of the polyvinylidene fluoride resin exceeds 10 $\mu$m, the resulting battery shows an increase of internal resistivity. Thus, the thickness of the polyvinylidene fluoride resin layer is preferably predetermined to be 10 $\mu$m or less. Further, when the thickness of the polyvinylidene fluoride resin layer is too small, the resulting liquid retaining properties are not improved. Thus, the polyvinylidene fluoride resin layer needs to have a thickness great enough to improve the liquid retaining properties of the electrodes. Thus, the lower limit of the thickness of the polyvinylidene fluoride resin layer is preferably predetermined to 2 $\mu$m or more.

When a nonaqueous secondary battery comprising a polyvinylidene fluoride resin layer formed on the surface of the electrodes is overcharged, heat runaway occurs if it comprises a separator made of a microporous membrane. However, if such a nonaqueous secondary battery comprises a separator made of a fibrous base material, no heat runaway occurs. This demonstrates that the separator for nonaqueous secondary battery comprising a polyvinylidene fluoride resin layer formed on the surface of the electrodes is preferably formed by a fibrous base material and as such a fibrous base material there is preferably used a non-woven cloth.

The method of fabricating a nonaqueous secondary battery of the invention comprises a steps of: forming a positive electrode and negative electrode including electrode active materials; coating a polyvinylidene fluoride resin layer with a solution at least on one surface of the positive electrode and negative electrode, removing the solution in a polyvinylidene fluoride resin layer; and laminating the positive and negative electrodes so that electrolyte is interposed therebetween.

According to the above structure, surfaces of the electrodes can be contacted with the electrolyte closely. Therefore battery which has an excellent liquid retaining properties and have a high battery capacity after high temperature storage, can be obtained.

BRIEF DESCRIPTION OF THE DRAWINGS

FIG. 1 is a diagrammatic view of a negative electrode plate.

FIG. 2 is a diagrammatic view of a positive electrode plate.

DESCRIPTION OF THE PREFERRED EMBODIMENTS

Figure 1A:
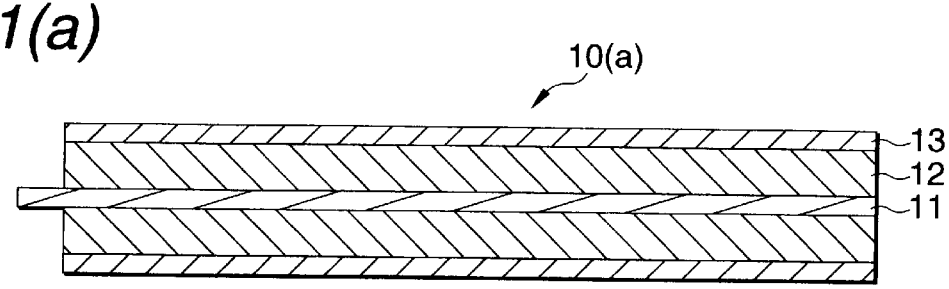
FIG. 1(a) is a sectional view illustrating a negative electrode plate comprising a polyvinylidene fluoride resin layer coated thereon.
Figure 1B:
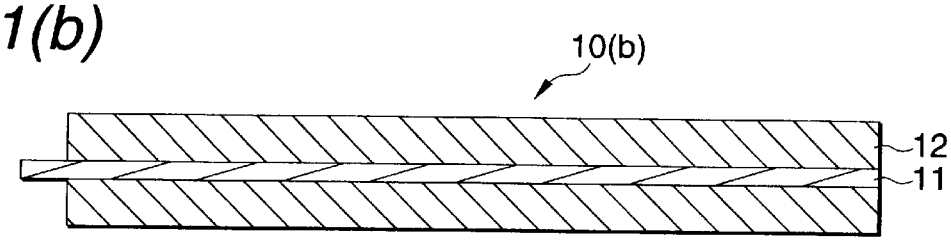
FIG. 1(b) is a sectional view illustrating a negative electrode plate comprising no polyvinylidene fluoride resin layer coated thereon.
Figure 2A:
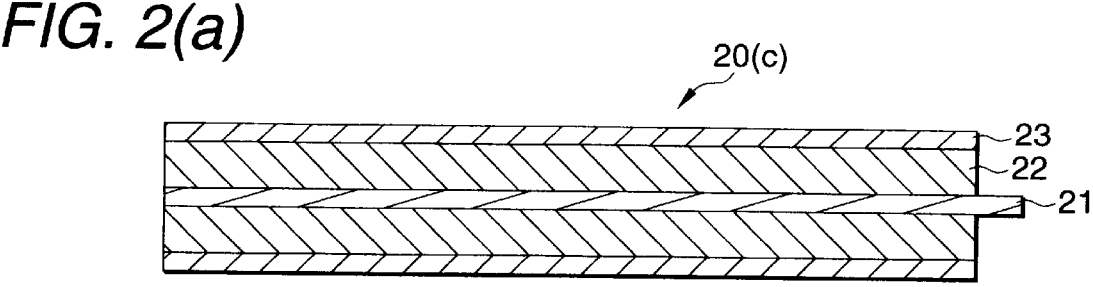
FIG. 2(a) is a sectional view illustrating a positive electrode plate comprising a polyvinylidene fluoride resin layer coated thereon.
Figure 2B:
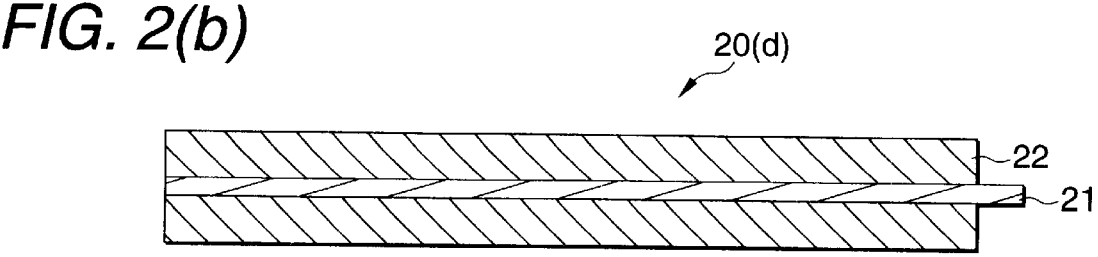
FIG. 2(b) is a sectional view illustrating a positive electrode plate no polyvinylidene fluoride resin layer coated thereon.
Figure 3:
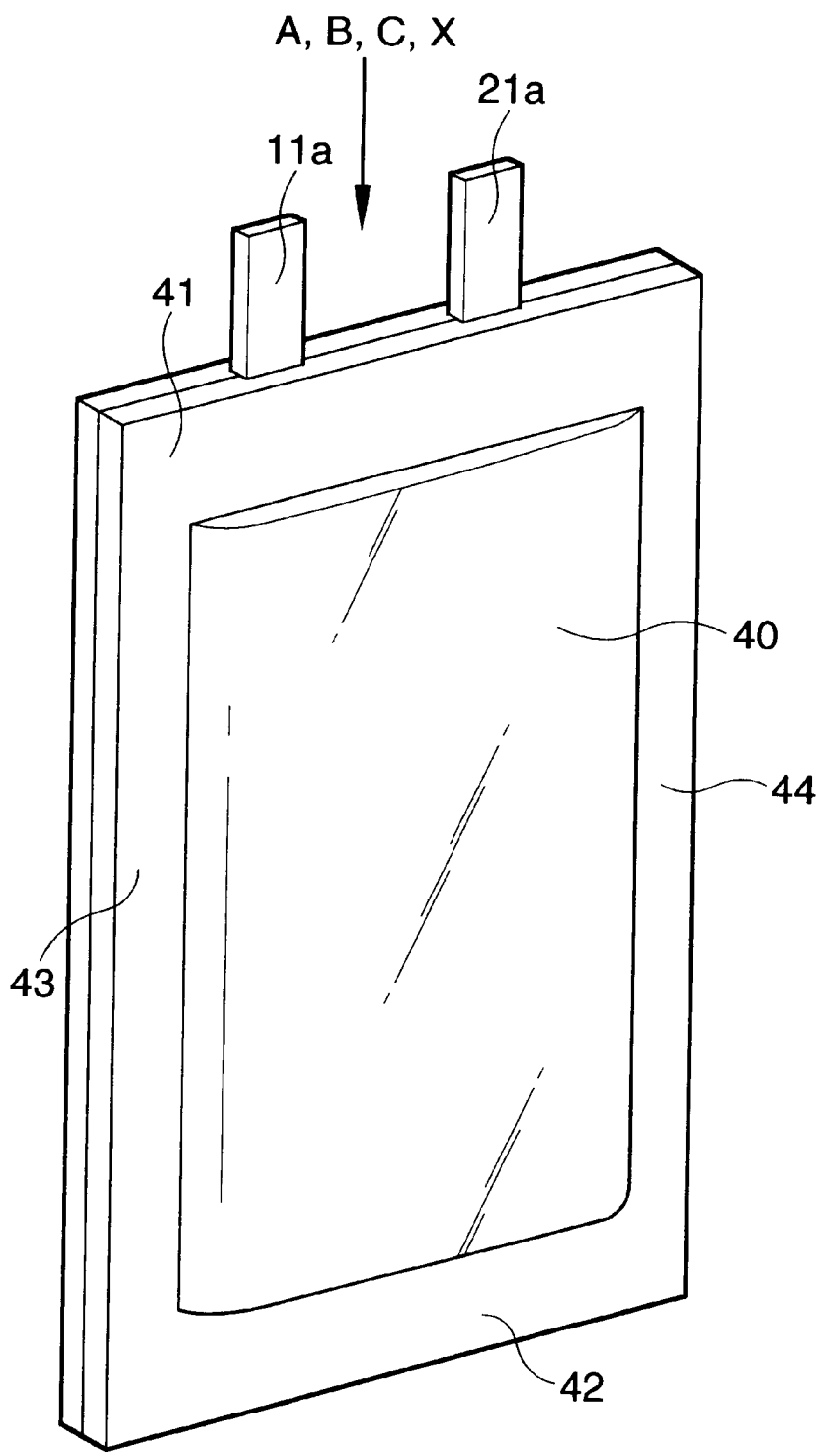
FIG. 3 is a diagrammatic view of a nonaqueous secondary battery formed by winding a laminate of a positive electrode plate and a negative electrode plate with a separator interposed therebetween, and then receiving the laminate thus wound in a laminate outer case. 10 . . . Negative electrode, 11a . . . Negative electrode collector tab, 20 . . . Positive electrode plate, 21a . . . Positive electrode collector tab, 40 . . . Outer case made of aluminum laminate, 41, 42, 43, 44 . . . Sealed portion

An embodiment of the nonaqueous secondary battery of the invention will be described hereinafter in connection with FIGS. 1 to 3. FIG. 1 is a diagrammatic view of a negative electrode plate, FIG. 1(a) is a sectional view illustrating a negative electrode plate comprising a polyvinylidene fluoride resin layer coated thereon, and FIG. 1(b) is a sectional view illustrating a negative electrode plate comprising no polyvinylidene fluoride resin layer coated thereon. FIG. 2 is a diagrammatic view of a positive electrode plate, FIG. 2(a) is a sectional view illustrating a positive electrode plate comprising a polyvinylidene fluoride resin layer coated thereon, and FIG. 2(b) is a sectional view illustrating a positive electrode plate no polyvinylidene fluoride resin layer coated thereon. FIG. 3 is a diagrammatic view of a nonaqueous secondary battery formed by winding a laminate of a positive electrode plate and a negative electrode plate with a separator interposed therebetween, and then receiving the laminate thus wound in a laminate outer case.

1. Preparation of Negative Electrode Plate

An active negative electrode material made of natural graphite (d=3.36 Å) and a fluororesin as a binder were mixed at a weight ratio of 95:5. The mixture was then dissolved in an organic solvent comprising N-methyl-2-pyrrolidone (NMP) to prepare a paste 12. The paste 12 thus prepared was then uniformly applied entirely to both surfaces of a metal core (e.g., copper foil having a thickness of 20 $\mu$m) by doctor blade method or the like. Subsequently, the coated material was passed through a dryer which had been heated, subjected to vacuum heat treatment at a temperature of from 100° C. to 150° C. to remove the organic solvent which had been needed during the preparation of paste, and then rolled to a thickness of 0.14 mm through a roll press to prepare a positive electrode plate 10.

Subsequently, a polyvinylidene fluoride (PVdF) and acetone were mixed at a weight ratio of 5:95. The mixture was then uniformly applied to the surface of the negative electrode plate 10 by doctor blade method or the like. The coated material was then subjected to vacuum heat treatment at a temperature of from 60° C. to 100° C. to form a polyvinylidene fluoride layer 13. The thickness of the polyvinylidene fluoride layer 13 thus formed was 2 $\mu$m. As the polyvinylidene fluoride there may be used a vinylidene fluoride homopolymer or a vinylidene fluoride copolymer of vinylidene fluoride with one or more selected from the group consisting of ethylene trifluorochloride, ethylene tetrafluoride, propylene hexafluoride and ethylene.

The negative electrode plate 10 comprising the polyvinylidene fluoride layer 13 coated thereon was designated as a negative electrode plate a while the negative electrode plate 10 comprising no polyvinylidene fluoride layer coated thereon was designated as a negative electrode plate b.

2. Preparation of Positive Electrode Plate

An active positive electrode material comprising lithium-containing cobalt dioxide ($LiCoO_2$) which had been subjected to heat treatment at a temperature of from 700° C. to 900° C., graphite and kitchen black as electrically conducting agents and a fluororesin as a binder were mixed at a weight ratio of 90:3:2:5. The mixture was then dissolved in an organic solvent comprising N-methyl-2-pyrrolidone (NMP) to prepare a paste 22.

The paste 22 thus prepared was then uniformly applied to both surfaces of a metal core 21 (e.g., aluminum foil having a thickness of 20 $\mu$m) by doctor blade method or the like. Subsequently, the coated material was passed through a dryer which had been heated, subjected to vacuum heat treatment at a temperature of from 100° C. to 150° C. to remove the organic solvent which had been needed during the preparation of paste, and then rolled to a thickness of 0.17 mm through a roll press to prepare a positive electrode plate 20.

Subsequently, a polyvinylidene fluoride (PVdF) and acetone were mixed at a weight ratio of 5:95. The mixture was then uniformly applied to the surface of the positive electrode plate 20 by doctor blade method or the like. The coated material was then subjected to vacuum heat treatment at a temperature of from 60° C. to 100° C. to form a polyvinylidene fluoride layer 23. The thickness of the polyvinylidene fluoride layer 23 thus formed was 2 $\mu$m. As the polyvinylidene fluoride there may be used a vinylidene fluoride homopolymer or a vinylidene fluoride copolymer of vinylidene fluoride with one or more selected from the group consisting of ethylene trifluorochloride, ethylene tetrafluoride, propylene hexafluoride and ethylene as mentioned above.

The positive electrode plate 20 comprising the polyvinylidene fluoride layer 23 coated thereon was designated as a positive electrode plate c while the positive electrode plate 20 comprising no polyvinylidene fluoride layer coated thereon was designated as a positive electrode plate d.

3. Preparation of Electrode Body

To the core body 11 of the negative electrode plate 10(a, b) thus prepared was then connected a negative electrode collector tab 11a. To the core body 21 of the positive electrode plate 20(c, d) thus prepared was then connected a positive electrode collector tab 21a. The positive electrode plate and the negative electrode plate were then laminated with an inexpensive separator (having a thickness of 0.025 mm for example) made of a non-woven cloth (fibrous base material) of polyethylene terephthalate (PET) having a porosity of 50% and a low reactivity with an organic solvent provided interposed therebetween. The laminate was then wound by a winding machine (not shown). The laminate was then fixed at its periphery with an adhesive tape to obtain a spirally wound electrode body. The spirally wound electrode body was then squeezed to flatness to prepare a tabular body.

4. Preparation of Electrolytic Solution $LiPF_6$ and $LiN(SO_2C_2F_5)_2$ were dissolved as electrolyte salts in a 3:7 (by volume) mixture of ethylene carbonate (EC) and diethyl carbonate (DEC) in a concentration of 0.05 mol/l and 0.95 mol/l, respectively, to prepare an electrolytic solution.

5. Preparation of Nonaqueous Secondary Battery

Subsequently, a 5-layer laminate material comprising a polyethylene terephthalate (PET), an adhesive, aluminum, an adhesive and an adhesive layer made of polypropylene as viewed from outside was laminated at the edge thereof. The pair of laminates were heat-sealed at the edge thereof to form sealed portions 43 and 44. Thus, a cylindrical outer case 40 was prepared.

Subsequently, as shown in FIG. 3, the tabular body formed by squeezing a spirally wound electrode body was inserted into the outer case 40 in an arrangement such that the positive electrode collector tab 21a and the negative electrode collector tab 11a come out of one of the openings of the outer case 40. The one opening of the outer case 40 was then heat-sealed with the positive electrode collector tab 21a and the negative electrode collector 11a being put between the edges of the opening to form a sealed portion 41.

Subsequently, the electrolytic solution thus prepared was injected into the outer case through the other opening of the outer case. The opening was heat-sealed to form a sealed portion 42. Thus, the outer case was sealed. As a result, four nonaqueous secondary batteries A, B, C and X were prepared. The nonaqueous secondary batteries A, B, C and X thus prepared each had a capacity of 500 mAh.

In some detail, the battery A was a nonaqueous secondary battery formed by the negative electrode 10(a) and the positive electrode 20(c), the battery B was a nonaqueous secondary battery formed by the negative electrode 10(a) and the positive electrode 20(d), the battery C was a nonaqueous secondary battery formed by the negative electrode 10(b) and the positive electrode 20(c), and the battery X was a nonaqueous secondary battery formed by the negative electrode 10(b) and the positive electrode 20(d).

6. High Temperature Storage Test

The four nonaqueous secondary batteries A, B, C and X thus prepared were each charged with a constant current of 500 mA (1C) until the battery voltage reached 4.1 V, and then charged at a constant voltage of 4.1 V for 3 hours to fullness. Thereafter, these batteries were each kept at room temperature for 10 minutes. These batteries were then discharged with current of 500 mA (1C) at room temperature until the termination voltage reached 2.75 V. The discharge capacity (mAh) before high temperature storage was determined from the discharge time.

Subsequently, these batteries were each again charged to fullness, stored at a temperature of 80° C. in a high temperature atmosphere for 4 days, discharged once, again charged, and then discharged with current of 500 mA (1C) until the battery voltage reached 2.75 V. The discharge voltage after high temperature storage was determined from discharge time. The ratio of discharge capacity after storage to discharge capacity before storage was then determined as reset capacity according to the following equation (1). The results are set forth in Table 1.

$$\% \text{ Reset capacity} = (\text{discharge capacity after storage} / \text{discharge capacity before storage}) \times 100 \ (\%) \quad (1)$$

TABLE 1

| Type of battery | Type of negative electrode | Type of positive electrode | % Reset capacity |
|---|---|---|---|
| A | a (provided with PVdF layer) | c (provided with PVdF layer) | 75 |
| B | a (provided with PVdF layer) | d (free of PVdF layer) | 73 |
| C | b (free of PVdF layer) | c (provided with PVdF layer) | 75 |
| X | b (free of PVdF layer) | d (free of PVdF layer) | 65 |

As can be seen in Table 1 above, the battery B comprising a polyvinylidene fluoride (PVdF) layer 13 formed on the surface of the negative electrode 10, the battery C comprising a polyvinylidene fluoride (PVdF) layer 23 formed on the surface of the positive electrode 20 and the battery A comprising polyvinylidene fluoride (PVdF) layers 13 and 23 formed on the surface of the negative electrode 10 and the positive electrode 23, respectively, exhibit a great reset capacity. The battery X comprising no polyvinylidene fluoride (PVdF) layer formed on these electrodes exhibits a small reset capacity.

The reason why the battery X has a small reset capacity is presumably that the absence of polyvinylidene fluoride (PVdF) layer causes the deterioration of the retention of electrolytic solution leading to an increase of internal resistivity that reduces the reset capacity. On the other hand, the reason why the batteries A, B and C have a great reset capacity is presumably that the presence of polyvinylidene fluoride (PVdF) layers 13 and 23 on either or both of the surface of the negative electrode 10 and the positive electrode 20, respectively, makes it possible to improve the retention of electrolytic solution and hence lower the internal resistivity of the battery, thereby reducing the capacity drop during high temperature storage and increasing the reset capacity.

Further battery c in which PVDF layer is formed only one surface of the positive electrode can reduce the capacity drop during high temperature storage same as the battery A in which PVDF layer is formed on both of the surfaces of the negative electrode and the positive electrode.

Contrary that, battery B in which PVDF layer is formed only one surface of the negative electrode has a little low capacity drop during high temperature storage.

These reasons are as follows. The negative electrode has originally high conductivity but the conductivity of the positive electrode is lower than that of the negative electrode. Therefore the positive electrode can be contacted with the separator more effectively than the negative electrode. Efficiency of the positive electrode can be improved. If increase of inner resistivity causes a problem, only on the surface of the positive electrode PVDF layer is preferably formed.

7. Study of the Thickness of Polyvinylidene Fluoride (PVdF) Layer

Subsequently, the change of internal resistivity with the thickness of the polyvinylidene fluoride (PVdF) layer was studied.

In some detail, the negative electrode 10 and the positive electrode 20 both comprising a polyvinylidene fluoride (PVdF) layer formed thereon were used. These electrodes and the same non-woven cloth of polyethylene terephthalate as mentioned above were wound in the same manner as mentioned above to form a spirally wound electrode body. The spirally wound electrode body thus formed was then inserted into the same outer case 40 as mentioned above to prepare a nonaqueous secondary battery as mentioned above.

The nonaqueous secondary battery comprising a polyvinylidene fluoride (PVdF) layer formed both on the negative electrode 10 and the positive electrode 20 to a thickness of 10 μm was designated as battery D, and the nonaqueous secondary battery comprising a polyvinylidene fluoride (PVdF) layer formed both on the negative electrode 10 and the positive electrode 20 to a thickness of 20 μm was designated as battery E.

Subsequently, these batteries were each measured for internal impedance (mΩ/cm$^2$) with ac of 1 kHz applied to the battery at its positive and negative electrode terminals. The results are set forth in Table 2 below. Table 2 also shows the internal impedance of the battery A mentioned above (nonaqueous secondary battery comprising a polyvinylidene fluoride (PVdF) layer having a thickness of 2 μm).

TABLE 2

| Type of battery | Thickness of PVdF layer | | Internal impedance (mΩ/cm$^2$) |
| --- | --- | --- | --- |
| | Negative electrode (μm) | Positive electrode (μm) | |
| A | 2 | 2 | 0.20 |
| D | 10 | 10 | 0.23 |
| E | 20 | 20 | 0.30 |

As can be seen in Table 2 above, while the battery E comprising a PVdF layer having a thickness of 20 μm exhibits an internal impedance (internal resistivity) of as great as 0.30 mΩ/cm$^2$, the battery A comprising a PVdF layer having a thickness of 2 μm and the battery D comprising a PVdF layer having a thickness of 10 μm exhibit an internal resistivity of as small as 0.20 mΩ/cm$^2$ and 0.23 mΩ/cm$^2$, respectively. This demonstrates that the more the thickness of PVdF layer is, the more is the internal resistivity of the battery.

Accordingly, as the thickness of PVdF layer decreases, the internal resistivity of the battery lowers to advantage. However, when the thickness of PVdF layer is too small, the electrodes exhibit a deteriorated retention of electrolytic solution. Accordingly, the thickness of PVdF layer is preferably such that the internal resistivity of the battery is low and the electrolytic solution can be fairly retained, i.e., from 2 μm to 10 μm, more preferably 5 to 8 μm.

8. Study of Separator Material

Subsequently, nonaqueous secondary batteries were prepared from the negative electrode 10(a) comprising the polyvinylidene fluoride (PVdF) layer 13 (having a thickness of 2 μm) formed thereon and the positive electrode 20(c) comprising the polyvinylidene fluoride (PVdF) layer 23 (having a thickness of 2 μm) formed thereon with the separator material being varied.

In some detail, the nonaqueous secondary battery comprising a separator made of a non-woven cloth (fibrous base material) of polypropylene (PP) was designated as battery F, the nonaqueous secondary battery comprising a separator made of a microporous membrane of polyethylene (PE) was designated as battery G, and the nonaqueous secondary battery comprising a separator made of a microporous membrane of polypropylene (PP) was designated as battery H.

Subsequently, the batteries F, G and H thus obtained, the foregoing battery A (battery comprising a PVdF layer formed on the surface of the negative electrode and the positive electrode and a non-woven cloth of PET as a separator), and the battery X (battery comprising no PVdF layer formed on the surface of the negative electrode and the positive electrode and a non-woven cloth of PET as a separator) were each continuously charged with a constant current of 500 mA (1C) with an electricity corresponding to 4 times the battery capacity (2,000 mAh). These batteries were each then examined for internal shortcircuiting and percent occurrence of abnormality such as combustion of battery. The results are set forth in Table 3 below.

TABLE 3

| Type of Battery | Type of separator | % Occurrence of abnormality | Details of abnormality |
| --- | --- | --- | --- |
| A | Non-woven cloth of PET | 0 | No abnormality |
| B | Non-woven cloth of PP | 0 | No abnormality |
| G | Microporous membrane of PE | 100 | Combustion |
| H | Microporous membrane of PP | 100 | Combustion |
| X | Non-woven cloth of PET | 100 | Internal short-circuiting, combustion |

As can be seen in Table 3 above, the battery A comprising a PVdF layer formed on the surface of the negative electrode and the positive electrode and a non-woven cloth (fibrous base material) of PET as a separator and the battery F comprising a PVdF layer formed on the surface of the negative electrode and the positive electrode and a non-woven cloth (fibrous base material) of PP as a separator showed a constant battery voltage and a battery surface temperature and thus showed no abnormalities.

On the contrary, the battery G comprising a PVdF layer formed on the surface of the negative electrode and the positive electrode and a microporous membrane of PE as a separator and the battery H comprising a PVdF layer formed on the surface of the negative electrode and the positive electrode and a microporous membrane of PP as a separator underwent heat runaway and combustion, though its cause being unknown. Further, the battery X comprising no PVdF layer formed on the surface of the negative electrode and the positive electrode and a non-woven cloth of PET as a separator underwent internal shortcircuiting at a rate of 50%. The remaining 50% of the specimens underwent heat runaway and combustion.

As can be seen in the foregoing results, the formation of a polyvinylidene fluoride (PVdF) layer on either or both of the surface of the positive electrode and the negative electrode and the use of a fibrous base material such as nonwoven cloth as a separator make it possible to obtain a nonaqueous secondary battery which exhibits an improved retention of electrolytic solution and hence less capacity drop during high temperature storage and improved high temperature storage properties.

As mentioned above, in the invention, polyvinylidene fluoride layers 13 and 23 are formed on either or both of the surface of the negative electrode 10 and the positive electrode 20, respectively, and the polyvinylidene fluoride layers 13, 23 are excellent in liquid retaining properties. The resulting nonaqueous secondary battery exhibits less capacity drop during high temperature storage and improved high temperature storage properties.

While the formation of such a polyvinylidene fluoride resin layer on the surface of the electrodes makes it possible to improve the liquid retaining properties of the electrodes, the increase of the thickness of the polyvinylidene fluoride resin layer causes an increase of the internal resistivity of the battery. Therefore, it is necessary that the thickness of the polyvinylidene fluoride resin layer be restricted.

It was experimentally confirmed that when the thickness of the polyvinylidene fluoride resin exceeds 10 $\mu$m, the resulting battery shows an increase of internal resistivity. Thus, the thickness of the polyvinylidene fluoride resin layer is preferably predetermined to be 10 $\mu$m or less. Further, when the thickness of the polyvinylidene fluoride resin layer is too small, the resulting liquid retaining properties are not improved. Thus, the polyvinylidene fluoride resin layer needs to have a thickness great enough to improve the liquid retaining properties of the electrodes, and the lower limit of the thickness of the polyvinylidene fluoride resin layer is preferably predetermined to 2 $\mu$m or more.

More preferably the thickness of the polyvinylidene fluoride resin layer is predetermined to 5–8 $\mu$m. In the case that the thickness is less than 5 $\mu$m, voltage drop caused by inner short circuit is easy to be occurred. In the case that the thickness is more than 8 $\mu$m, ion conductivity is remarkably lowered at a low temperature and discharge capacity at a low temperature is lowered.

Further heat treatment temperature is preferably 60–150° C. At the temperature less than 60° C., solvent is left, battery cycle characteristic and keeping characteristic are lowed. On the other hand, at the temperature more than 150° C., PVdF itself is dissolved, and battery characteristics is remarkably lowed.

The foregoing embodiment has been described with reference to the case where a 5-layer laminate material is used as an outer case 40. However, as the outer case 40 there may be used an outer case made of metal such as stainless steel and aluminum besides the foregoing laminate material.

The foregoing embodiment has also been described with reference to the case where as an active negative electrode material there is used natural graphite (d=3.36 Å). However, a carbon material capable of intercalating/deintercalating lithium ion may be used besides natural graphite. Preferred examples of such a carbon material include carbon black, coke, glassy fiber, carbon fiber, and calcination product thereof.

The foregoing embodiment has also been described with reference to the case where as an active positive electrode material there is used $LiCoO_2$. A lithium-containing transition metal compound which receives lithium ion as a guest may be used besides $LiCoO_2$. Preferred examples of such a lithium-containing transition metal compound include $LiNiO_2$, $LiCo_xNi_{(1-x)}O_2$, $LiCrO_2$, $LiVO_2$, $LiMnO_2$, $LiFeO_2$, $LiTiO_2$, $LiScO2$, $LiYO_2$, and $LiMn_2O_4$. It is particularly preferred that $LiCoO_2$, $LiNiO_2$, $LiCo_xNi_{(1-x)}O_2$, and $LiMn_2O_4$ be used singly or in combination of two or more thereof.

As the electrolytic solution there may be used any ionic conductor obtained by dissolving a lithium salt as a solute in an organic solvent so far as it has a high ionic conductivity, behaves inertly chemically and electrochemically to the positive and negative electrodes and is inexpensive. As the organic solvent there may be preferably used propylene carbonate (PC), sulfolan (SL), tetrahydrofuran (THF), γ-butyrolactone (GBL) or mixture thereof besides the foregoing organic solvent.

Alternatively, a gel-like electrolyte containing a polymerizable compound such as acrylate-based polymer and urethane acrylate-based polymer may be used.

As the solute there may be used a lithium salt having a strong electrophilicity. Besides $LiPF_6$ or $LiN(SO_2C_2F_5)_2$, there may be preferably used $LiAsF_5$, $LiSO_3CF_3$, $LiN(SO_2CF_3)_2$ and $LiSO_3C_4F_9$, singly or in combination of two or more thereof.

Instead of forming a PVDF on a surface of the electrode, PVDF can be formed on the surface of the separator.

Further the lithium ion secondary battery can be constituted so that solid electrolyte or gel electrolyte is interposed between the negative and positive electrodes without using a separator.

What is claimed is:

1. A nonaqueous secondary battery comprising negative electrode capable of intercalating/deintercalating lithium ion, a positive electrode made of a lithium-containing metal oxide as an active positive electrode material, and a nonaqueous electrolyte, wherein a polyvinylidene fluoride resin layer has a thickness of 5 to 8 $\mu$m and is formed on at least one of the surfaces of said positive electrode and said negative electrode.

2. The nonaqueous secondary battery according to claim 1, wherein a separator for separating said positive electrode and said negative electrode from each other is interposed between said negative and positive electrodes.

3. The nonaqueous secondary battery according to claim 1, wherein said polyvinylidene fluoride resin layer is formed on surfaces of both of said positive electrode and said negative electrode.

4. The nonaqueous secondary battery according to claim 1, wherein said polyvinylidene fluoride resin layer is formed only on a surface of said positive electrode.

5. The nonaqueous secondary battery according to claim 1, wherein as said polyvinylidene fluoride resin there is used a vinylidene fluoride homopolymer or a vinylidene fluoride copolymer of vinylidene fluoride with one or more selected from the group consisting of ethylene trifluorochloride, ethylene tetrafluoride, propylene hexafluoride and ethylene.

6. The nonaqueous secondary battery according to claim 2, wherein said separator is made of a fibrous base material.

7. The nonaqueous secondary battery according to claim 6, wherein said fibrous base material is a non-woven cloth.

8. The nonaqueous secondary battery according to claim 1, wherein said positive electrode comprises as an active positive electrode material a lithium-containing cobalt oxide and said negative electrode comprises as an active negative electrode material graphite.

9. The nonaqueous secondary battery according to claim 1, wherein said nonaqueous electrolyte is made of gel electrolyte.

* * * * *